US012080112B2

United States Patent
Doi et al.

(10) Patent No.: US 12,080,112 B2
(45) Date of Patent: Sep. 3, 2024

(54) ELECTRONIC CONTROL DEVICE AND DIAGNOSIS METHOD OF ELECTRONIC CONTROL DEVICE

(71) Applicant: Hitachi Astemo, Ltd., Hitachinaka (JP)

(72) Inventors: Masahiro Doi, Hitachinaka (JP); Yasushi Sugiyama, Hitachinaka (JP); Yuri Ohara, Hitachinaka (JP); Takeo Yamashita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 414 days.

(21) Appl. No.: 17/438,221

(22) PCT Filed: Feb. 5, 2020

(86) PCT No.: PCT/JP2020/004244
§ 371 (c)(1),
(2) Date: Sep. 10, 2021

(87) PCT Pub. No.: WO2020/195192
PCT Pub. Date: Oct. 1, 2020

(65) Prior Publication Data
US 2022/0189217 A1    Jun. 16, 2022

(30) Foreign Application Priority Data
Mar. 26, 2019   (JP) .................. 2019-057976

(51) Int. Cl.
*B60R 16/023* (2006.01)
*B60R 16/03* (2006.01)
(Continued)

(52) U.S. Cl.
CPC ............ *G07C 5/0808* (2013.01); *B60R 16/03* (2013.01); *H02J 7/0063* (2013.01); *B60R 16/0232* (2013.01)

(58) Field of Classification Search
CPC ............ G06F 11/2294; G06F 11/2205; G06F 11/0757; B60R 16/0232
See application file for complete search history.

(56) References Cited

U.S. PATENT DOCUMENTS 5,465,209 A * 11/1995 Sammut ............. B60G 17/0155
701/37
5,483,145 A *  1/1996 Shiojima ........... H02J 7/007194
320/155
(Continued)

FOREIGN PATENT DOCUMENTS

JP    2002-14702 A    1/2002
JP    2002-89336 A    3/2002
(Continued)

OTHER PUBLICATIONS

International Search Report (PCT/ISA/210) issued in PCT Application No. PCT/JP2020/004244 dated Mar. 31, 2020 with English translation (five (5) pages).

(Continued)

*Primary Examiner* — Steven B Theriault
(74) *Attorney, Agent, or Firm* — Crowell & Moring LLP

(57) ABSTRACT

Provided is an electronic control device including a timer that operates during a key-off time period, the electronic control device having high reliability to diagnose whether the timer is normally operated even during the key-off time period. The electronic control device includes a first power supply unit to which a battery voltage is always supplied as a power supply voltage, the first power supply unit including a first timer that measures a key-off time period, a diagnostic timer different from the first timer, and a first timer diagnosis unit that compares a timer value of the first timer with that of the diagnostic timer during the key-off time period.

12 Claims, 8 Drawing Sheets

(51) Int. Cl.
*G07C 5/08* (2006.01)
*H02J 7/00* (2006.01)

(56) References Cited

U.S. PATENT DOCUMENTS

| | | | | |
|---|---|---|---|---|
| 5,602,736 | A | * | 2/1997 | Toya ................... B60R 21/0132 280/735 |
| 5,744,874 | A | * | 4/1998 | Yoshida ............. G07C 9/00182 340/426.36 |
| 5,918,040 | A | * | 6/1999 | Jarvis ....................... G04G 7/00 713/375 |
| 6,037,744 | A | * | 3/2000 | Rhodes ................... H02J 7/342 320/103 |
| 6,531,872 | B1 | * | 3/2003 | Carr ...................... F02D 41/222 324/380 |
| 7,136,780 | B2 | * | 11/2006 | Hirashima ........... G01R 31/006 702/185 |
| 7,155,323 | B2 | * | 12/2006 | Ishida ................. B60R 21/0152 307/43 |
| 7,210,055 | B2 | * | 4/2007 | Honda ................ F02D 41/2403 713/502 |
| 9,006,924 | B2 | * | 4/2015 | Kuno ................... F02D 41/266 307/10.6 |
| 10,690,080 | B2 | * | 6/2020 | Kim ....................... G01K 1/026 |
| 2002/0019951 | A1 | * | 2/2002 | Kubo ....................... G06F 1/14 713/400 |
| 2003/0093189 | A1 | * | 5/2003 | Honda ................. F02D 41/221 701/1 |
| 2005/0143879 | A1 | * | 6/2005 | Yasuda ............... G05B 23/0221 701/22 |
| 2005/0187681 | A1 | * | 8/2005 | Suzuki ................... F02D 41/26 701/1 |
| 2006/0247835 | A1 | * | 11/2006 | Nagata ................. F02D 41/266 701/36 |
| 2007/0175720 | A1 | * | 8/2007 | Yoshida ................ F16D 48/066 192/3.63 |
| 2008/0109623 | A1 | * | 5/2008 | Hoshino ................ G11C 16/10 711/E12.001 |
| 2008/0178015 | A1 | * | 7/2008 | Sago ..................... F02D 41/266 713/300 |
| 2010/0213964 | A1 | * | 8/2010 | Bogenberger ... G01R 31/31701 324/750.3 |
| 2011/0054708 | A1 | | 3/2011 | Sato et al. |
| 2011/0184677 | A1 | * | 7/2011 | Tae ...................... G01R 31/396 702/63 |
| 2011/0199051 | A1 | * | 8/2011 | Shimizu ................ H02J 7/0016 320/116 |
| 2012/0025769 | A1 | * | 2/2012 | Kikuchi .................. B60L 58/14 320/118 |
| 2012/0253569 | A1 | * | 10/2012 | Novak .............. B60W 50/0205 180/65.21 |
| 2013/0067256 | A1 | * | 3/2013 | Shiraishi ............... H01M 10/48 713/320 |
| 2014/0365066 | A1 | * | 12/2014 | Murase ................... F02D 41/22 701/30.8 |
| 2015/0258896 | A1 | * | 9/2015 | Otsu ......................... B60L 3/12 701/22 |
| 2016/0257208 | A1 | * | 9/2016 | Chong ...................... H02J 1/10 |
| 2017/0277584 | A1 | * | 9/2017 | Suzuki ................ G06F 11/0757 |
| 2017/0344418 | A1 | * | 11/2017 | Ueda ................ G06F 11/0793 |
| 2018/0119804 | A1 | * | 5/2018 | Shiiya ..................... B60R 16/02 |
| 2018/0129244 | A1 | * | 5/2018 | Ichioka ..................... G06F 1/04 |
| 2018/0236890 | A1 | * | 8/2018 | Cyrne ....................... B60L 3/12 |
| 2019/0078527 | A1 | * | 3/2019 | Kim ...................... F02D 41/2403 |
| 2019/0195157 | A1 | * | 6/2019 | Koo ..................... G07C 5/0808 |
| 2019/0232902 | A1 | * | 8/2019 | Teng ........................ H02J 1/10 |
| 2019/0265664 | A1 | * | 8/2019 | Sato ..................... G05B 19/042 |
| 2020/0143609 | A1 | * | 5/2020 | Neelakantan ............ H02J 9/06 |
| 2020/0240367 | A1 | * | 7/2020 | Ishii .................... F02M 25/0809 |
| 2020/0273267 | A1 | * | 8/2020 | Takahashi ............... G06F 11/22 |
| 2020/0408831 | A1 | * | 12/2020 | Yoon ................... G06F 11/0757 |

FOREIGN PATENT DOCUMENTS

| | | |
|---|---|---|
| JP | 2011-46233 A | 3/2011 |
| JP | 2017-187860 A | 10/2017 |

OTHER PUBLICATIONS

Japanese-language Written Opinion (PCT/ISA/237) issued in PCT Application No. PCT/JP2020/004244 dated Mar. 31, 2020 (four (4) pages).

* cited by examiner

ELECTRONIC CONTROL DEVICE AND DIAGNOSIS METHOD OF ELECTRONIC CONTROL DEVICE

TECHNICAL FIELD

The present invention relates to a configuration of an electronic control device and a diagnosis method thereof, and particularly relates to a technique that is effectively applicable to an electronic control device for a vehicle that requires high reliability and safety (fail-safe function).

BACKGROUND ART

In an electronic control device, a timer is used for various purposes. In an electronic control device for a vehicle, a timer is used in diagnosing several sensors and diagnosing parts of the vehicle every predetermined time interval while the vehicle is stopped.

For example, the timer mounted on the electronic control device is used to diagnose whether a temperature sensor (water temperature sensor) measuring a temperature of cooling water is normally operated. The temperature of the cooling water, which has risen during the operation of the vehicle, gradually decreases over time during a key-off time period when the vehicle is stopped. By comparing how much the water temperature of the cooling water measured by the water temperature sensor decreases relative to the key-off time period of the vehicle, it can be diagnosed whether the water temperature sensor is normally operated. In order to diagnose the water temperature sensor, it is necessary to diagnose whether the timer counting a key-off time period is normally operated.

In addition, the timer is used to regularly diagnose vehicle parts every predetermined time interval while the vehicle is stopped. A key-off time period is measured by the timer and the electronic control device is activated every predetermined time interval to perform the diagnosis of the vehicle parts.

In this way, various vehicle parts are diagnosed to safely operate the vehicle, and an engine control device also uses a timer that measures a key-off time period to perform various kinds of diagnosis. In order to reliably diagnose these vehicle parts, it is important to diagnose whether the timer operating during the key-off time period is normally operated.

An example of a conventional technique for diagnosing operation of the timer, which operates during the key-off time period, includes a technique as in PTL 1. PTL 1 discloses "an electronic control device including a control unit operated or stopped according to a power supply status that depends on how a power switch is changed over and a time measurement unit measuring a time continuously regardless of whether the control unit is operated or stopped, the control unit having an internal timer by which a time is measured during a predetermined time period to determine that the time measurement unit is abnormal based on the time measured by the time measurement unit in the predetermined time period". The timer having operated during the key-off time period is operated during a key-on time period as well to compare the timer relative to the internal timer of the microcomputer during the key-on time period every predetermined time interval, thereby diagnosing the operation of the timer. When the timer fails, diagnosis of sensor failure is prohibited.

CITATION LIST

Patent Literature

PTL 1: JP 2002-14702 A

SUMMARY OF INVENTION

Technical Problem

According to PTL 1, the timer that measures a time during the key-off period is operated during a key-on time period to perform diagnosis. However, it is not possible to diagnose whether the timer is normally operated during the key-off time period, which is essentially necessary. That is, the technique according to PTL 1 is not capable of detecting abnormality such as a temporary timer stop function during the key-off time period or a defect occurring only during the key-off time period. In such a state, if a timer value obtained during the key-off time period is used in diagnosing vehicle parts related to the key-off time period, the vehicle parts may sometimes be abnormally diagnosed.

An object of the present invention is to provide an electronic control device including a timer that operates during a key-off time period, the electronic control device having high reliability to diagnose whether the timer is normally operated even during the key-off time period, and a diagnosis method thereof.

Solution to Problem

According to the present invention for solving the aforementioned problems, an electronic control device includes a first power supply unit to which a battery voltage is always supplied as a power supply voltage. The first power supply unit includes: a first timer that measures a key-off time period; a diagnostic timer different from the first timer; and a first timer diagnosis unit that compares a timer value of the first timer with that of the diagnostic timer during the key-off time period.

According to the present invention, a diagnosis method of an electronic control device includes: a step (a) of turning off an ignition signal; a step (b) of starting a first timer and a diagnostic timer of a first power supply unit; a step (c) of shutting down a second power supply unit and a microcomputer; a step of (d) counting up respective timer values of the first timer and the diagnostic timer at predetermined time intervals during a key-off time period; a step (e) of comparing the first timer and the diagnostic timer every predetermined count cycle; and a step (f) of determining whether or not a change amount of a timer value of each of the first timer and the diagnostic timer is within a predetermined range. In the step (f), if the change amount of the timer value of each of the first timer and the diagnostic timer is within the predetermined range, the first timer is determined as being normal, and if the change amount of the timer value of each of the first timer and the diagnostic timer is beyond the predetermined range, the first timer is determined as being abnormal.

Advantageous Effects of Invention

According to the present invention, an electronic control device including a timer that operates during a key-off time period, the electronic control device having high reliability to diagnose whether the timer is normally operated even during the key-off time period, and a diagnosis method thereof can be provided.

Accordingly, it is possible to reliably diagnose the timer operating during the key-off time period and the vehicle parts controlled based thereon.

Other problems, configurations, and effects that are not described above will be apparent from the following description of embodiments.

DESCRIPTION OF EMBODIMENTS

Figure 5:
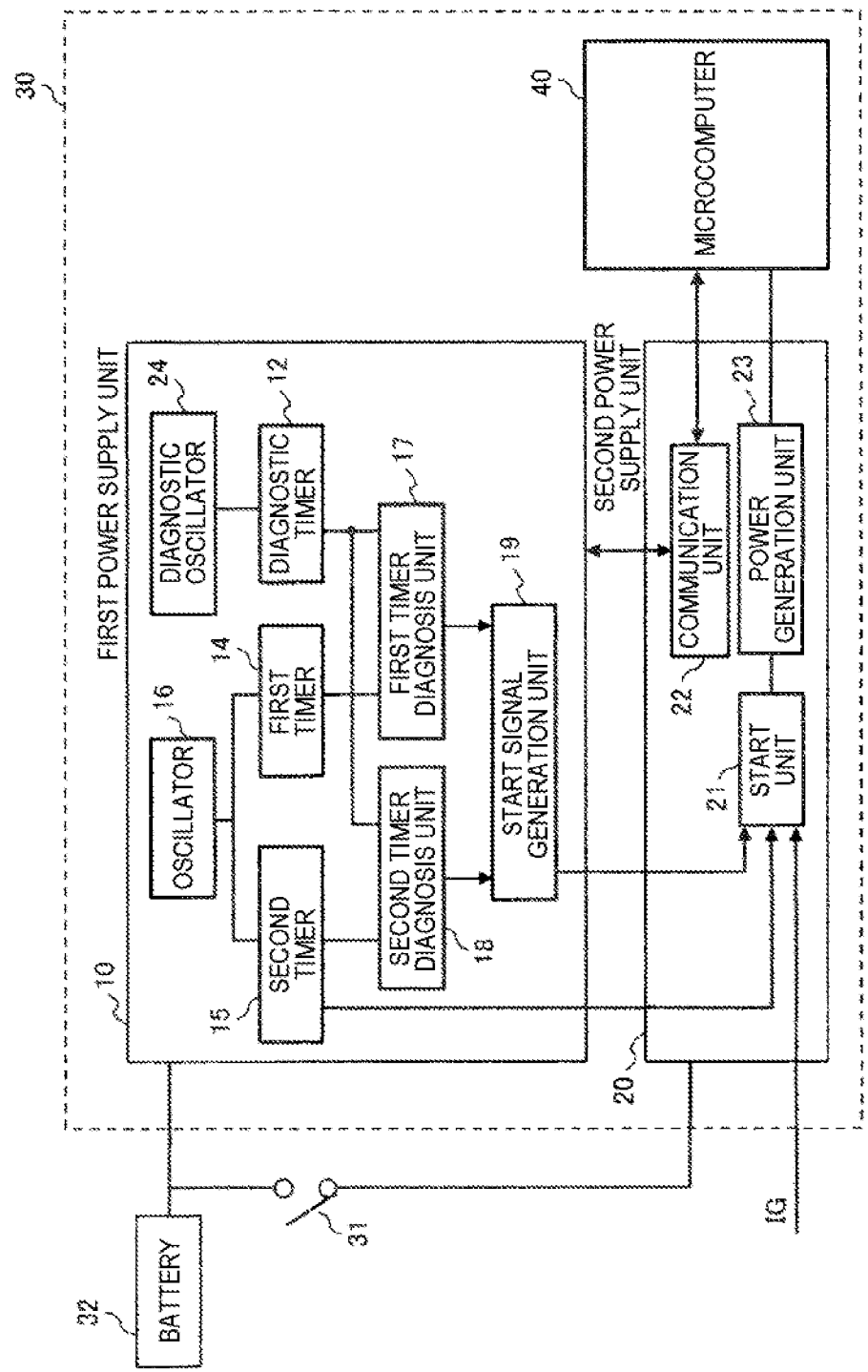
FIG. 5 is a schematic configuration diagram of an electronic control device in a fifth embodiment.
Figure 6:
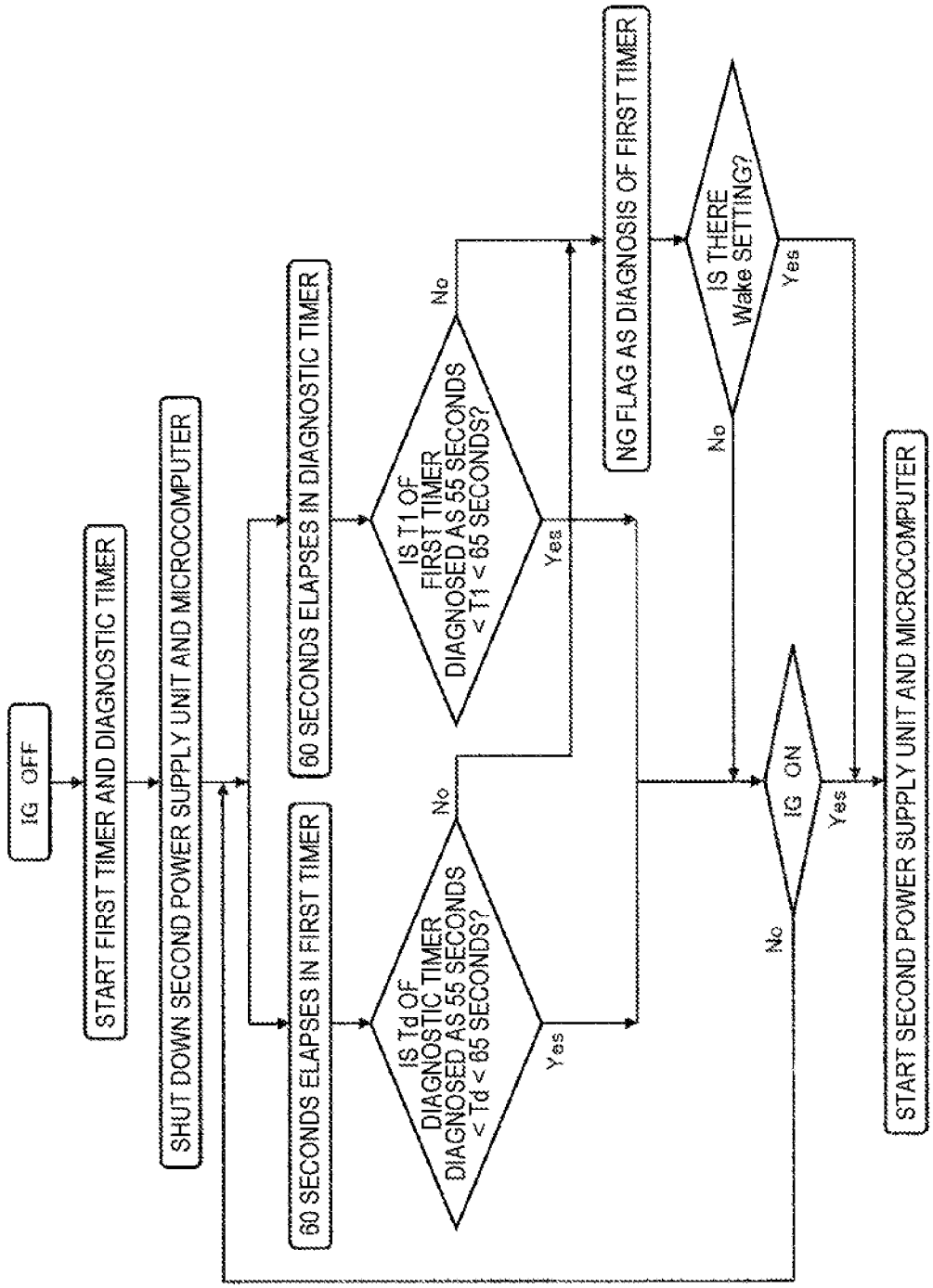
FIG. 6 is a flowchart of timer diagnosis in the second embodiment.
Figure 7:
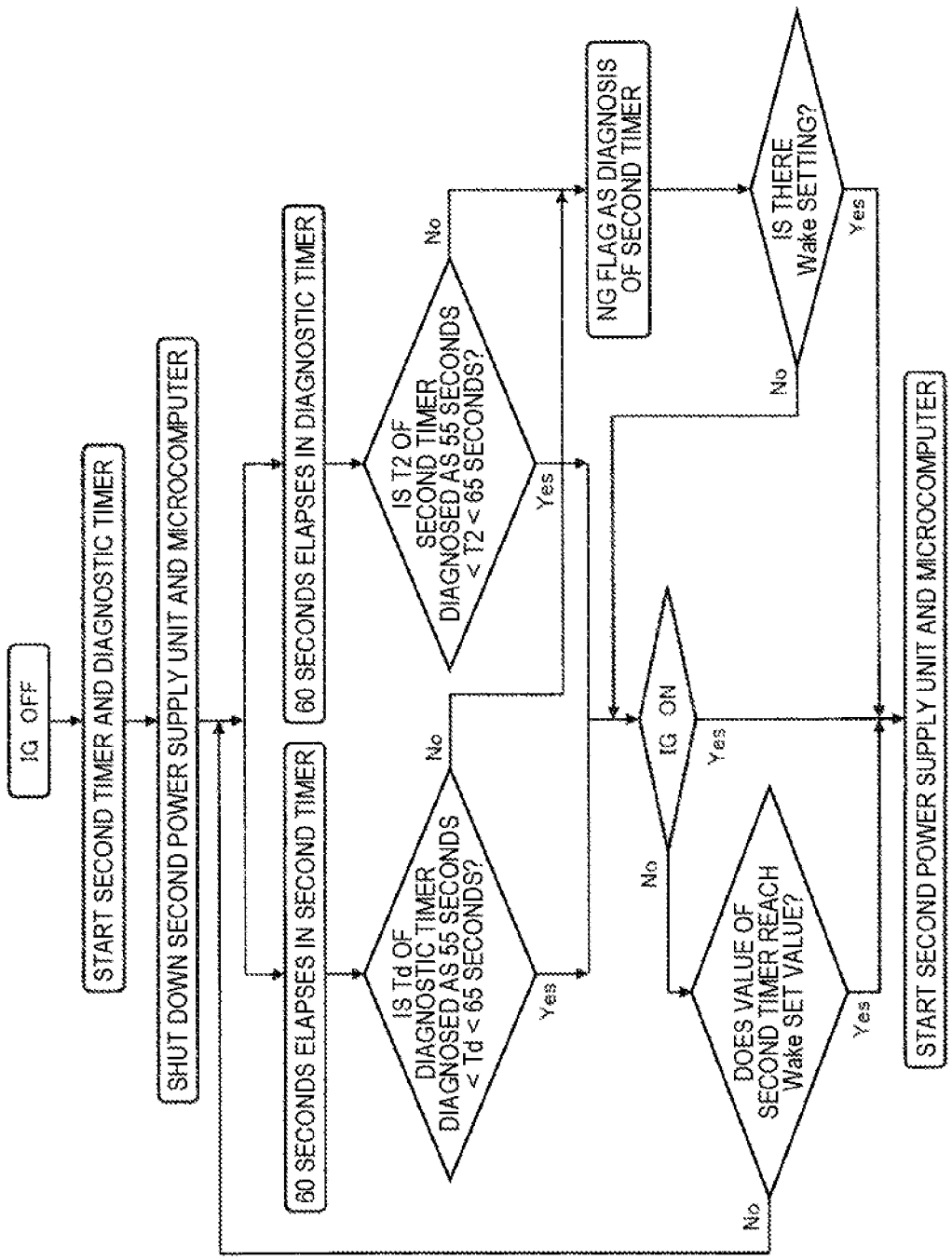
FIG. 7 is a flowchart of timer diagnosis in the third embodiment.
Figure 8:
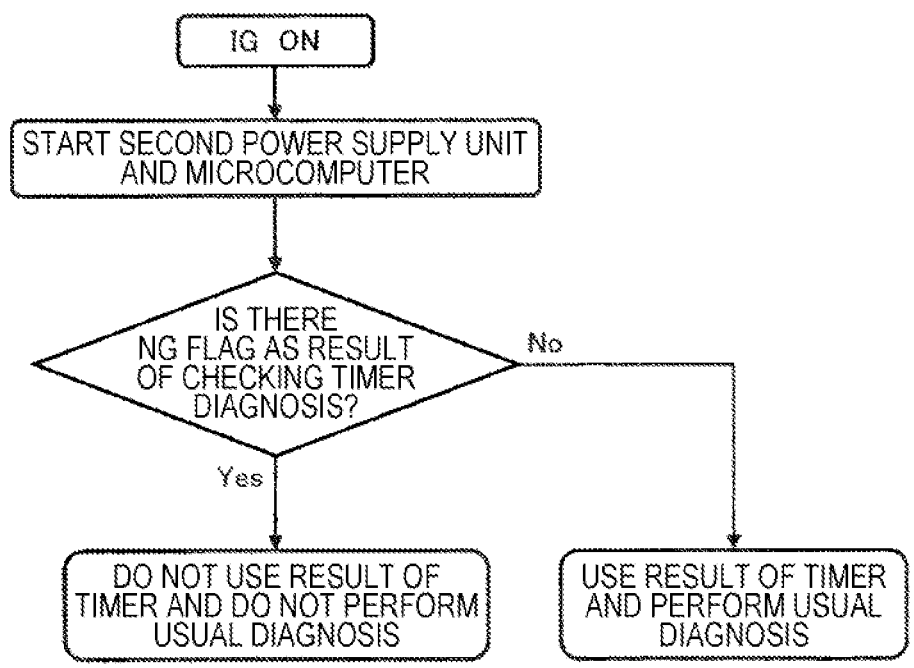
FIG. 8 is a flowchart after a second power supply unit and a microcomputer are started in the second embodiment.

Hereinafter, embodiments of the present invention will be described with reference to the drawings. It should be noted that in respective drawings, the same reference numerals are given to the same components and the detailed description of overlapping portions will be omitted. In addition, respective configuration diagrams of FIGS. 1 through 5 and respective flowcharts of FIGS. 6 through 8 are examples of the embodiments according to the present invention and do not limit the claims.

First Embodiment

Figure 1:
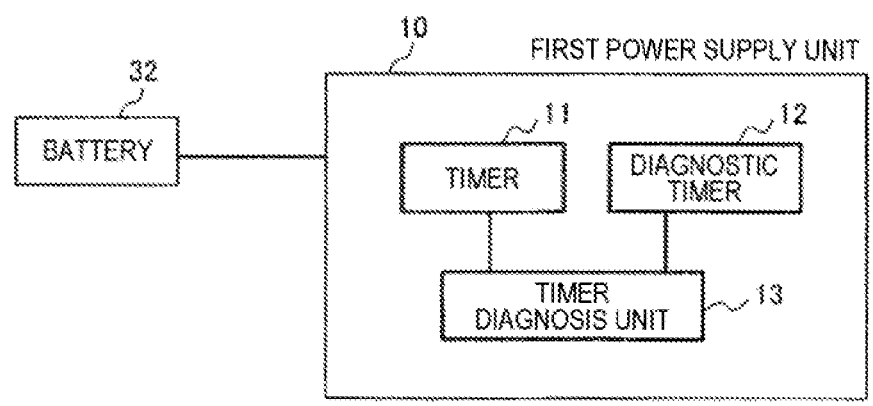
FIG. 1 is a schematic configuration diagram of a first power supply unit in a first embodiment.

An electronic control device according to a first embodiment of the present invention will be described with reference to FIG. 1. FIG. 1 is a minimum circuit configuration according to the present invention and illustrates a configuration of a first power supply unit 10, which is a part of the electronic control device.

In FIG. 1, a battery 32 and a first power supply unit 10, to which the battery 32 is always connected and a battery voltage is always supplied as a power supply voltage, are included. The first power supply unit 10 includes a timer 11 for measuring a key-off time period, a diagnostic timer 12, and a timer diagnosis unit 13 comparing a timer value of the timer 11 and a timer value of the diagnostic timer 12 with each other to diagnose whether each of the timers is normally operated.

The operation of the timer 11 for measuring a key-off time period is diagnosed by the timer diagnosis unit 13 at predetermined time intervals during the key-off time period. When either the timer 11 or the diagnostic timer 12 deteriorates in timer accuracy or stops due to its failure, a diagnosis result as abnormality is left in the timer diagnosis unit 13. The electronic control device including the first power supply unit 10 detects the abnormality of the timer 11 or the diagnostic timer 12 by reading out the diagnosis result as abnormality from the timer diagnosis unit 13 after a key-on time period recommences.

In addition, if there is no diagnosis result as abnormality, the timer 11 is not abnormally operated during the entire key-off time period, and the value of the timer 11 is a normal value, which allows the electronic control device to diagnose vehicle parts related to the key-off time period.

Here, the diagnosis of the timer may be continuously performed during the key-on time period as well as during the key-off time period. When abnormality of the timer occurs during the key-on time period, diagnosis as abnormality may be retained in the timer diagnosis unit 13 and detected by the electronic control device likewise.

As described above, the electronic control device in this embodiment includes a first power supply unit 10 to which a battery voltage of the battery 32 is always supplied as a power supply voltage, and the first power supply unit 10 includes a first timer 11 measuring a key-off time period, a diagnostic timer 12 different from the first timer 11, and a first timer diagnosis unit 13 comparing a timer value of the first timer 11 with that of the diagnostic timer 12 during the key-off time period.

By comparing the first timer 11 and the diagnostic timer 12 during the key-off time period, it is possible to diagnose mutual operation between the timers, thereby diagnosing operation of the timer that measures the key-off time period.

Second Embodiment

Figure 2:
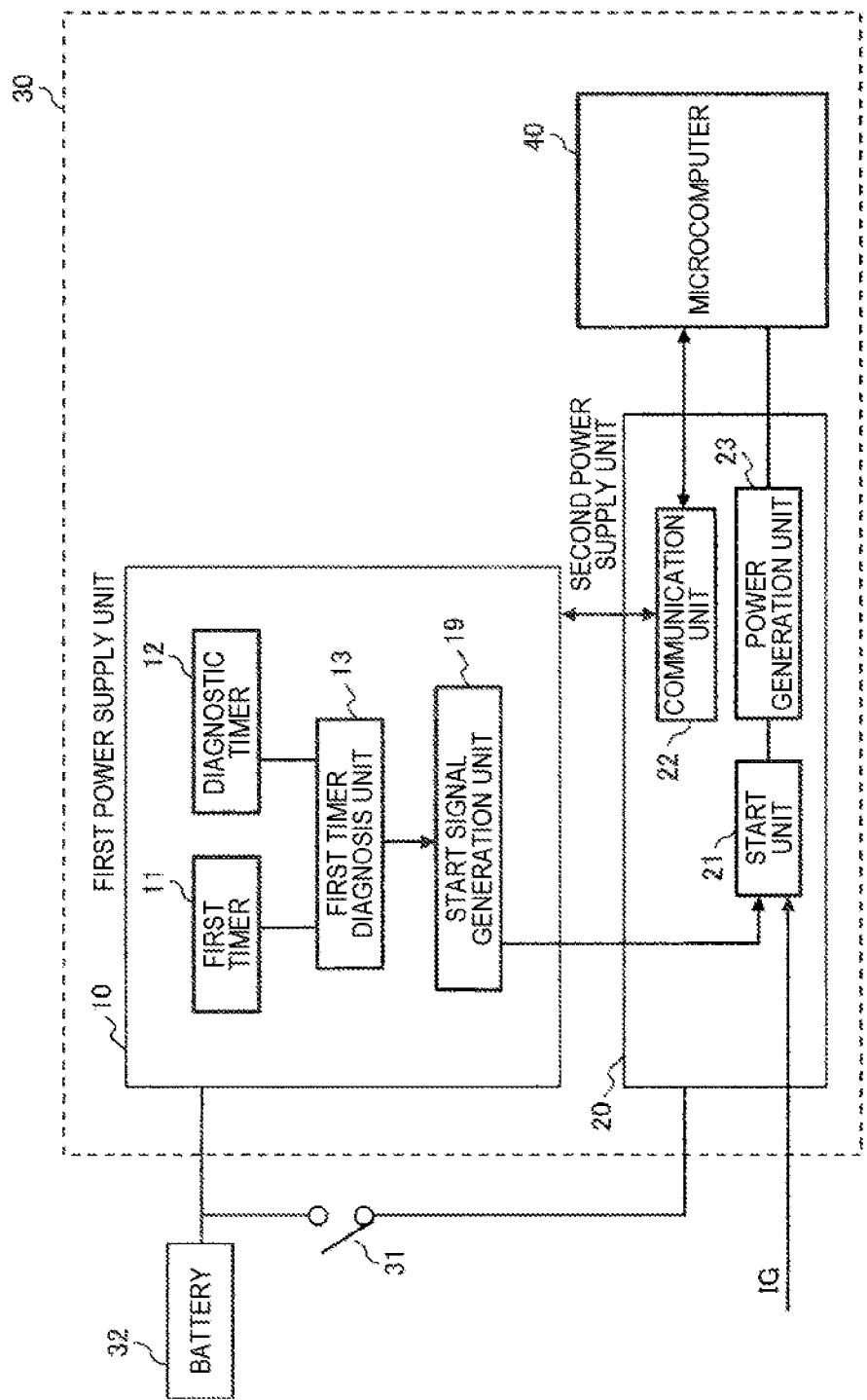
FIG. 2 is a schematic configuration diagram of an electronic control device in a second embodiment.

An electronic control device according to a second embodiment of the present invention will be described with reference to FIGS. 2, 6, and 8. FIG. 2 illustrates a circuit configuration of the electronic control device in this embodiment. FIG. 6 illustrates a flowchart of timer diagnosis of the electronic control device in this embodiment. In addition, FIG. 8 illustrates a flowchart after a second power supply unit and a microcomputer of the electronic control device in this embodiment are started.

In FIG. 2, a battery 32, an electronic control device 30, and a power relay 31 are included. The electronic control device 30 includes a first power supply unit 10 always connected to the battery 32 to be supplied with power, a second power supply unit 20 supplied with power from the battery 32 through the power relay 31 controlled to be turned on or off based on an ignition signal IG, and a microcomputer 40.

The first power supply unit 10 includes a first timer 11 for measuring a key-off time period, a diagnostic timer 12, a first timer diagnosis unit 13, and a start signal generation unit 19.

The second power supply unit 20 includes a start unit 21 for starting the second power supply unit 20, a power generation unit 23 for generating power to a control unit including the microcomputer 40, and a communication unit 22.

The second power supply unit 20 is started based on an ignition signal IG and a battery voltage supplied from the battery 32 through the power relay 31 turned on by the ignition signal IG. After the second power supply unit 20 is started, a power supply voltage is supplied to the microcomputer 40 by the power generation unit 23. The power-supplied microcomputer 40 can detect a timer diagnosis result by communicating with the first power supply unit 10 through the communication unit 22.

Here, as in an example of a flowchart for the electronic control device illustrated in FIG. 6, when the ignition signal IG is turned off, the microcomputer 40 starts the first timer 11 and the diagnostic timer 12 through the communication unit 22, and subsequently, shuts down the second power supply unit 20 and the microcomputer 40.

During the key-off time period, the first timer 11 and the diagnostic timer 12 count up timer values at predetermined time intervals. The first timer diagnosis unit 13 compares the first timer 11 and the diagnostic timer 12 every predetermined count cycle. In the example of FIG. 6, if a change amount of each timer value from a compared timer value every 60 seconds is between 55 seconds and 65 seconds, the timer is diagnosed as being normal (Yes). Otherwise, the timer is diagnosed as being abnormal (No).

In case of diagnosis as normality (Yes), diagnosis is repeatedly and continuously performed in the same way every 60 seconds, and the diagnosis of the timer is performed during the key-off time period.

On the other hand, in case of diagnosis as abnormality (No), an NG flag as the diagnosis of the first timer is recorded in the first timer diagnosis unit 13. When a key-on time period commences, if a start setting of the second power supply unit 20 is in an on-state as a setting for diagnosis as abnormality from the microcomputer 40, the second power supply unit 20 is started in response to a start signal from the start signal generation unit 19 according to the determination of diagnosis as abnormality. If the start setting is in an off-state, the diagnosis of the timer is continued until the ignition signal IG is turned on.

In an example of a flowchart after the second power supply unit and the microcomputer are started as illustrated in FIG. 8, immediately after the ignition signal IG is turned on and the second power supply unit 20 and the microcomputer 40 are started, the timer diagnosis result is read out from the first timer diagnosis unit 13. In case of diagnosis as abnormality (there is an NG flag: Yes), it can be selected not to perform diagnosis of vehicle parts controlled based on the first timer 11, thereby preventing erroneous diagnosis of the vehicle parts.

On the other hand, in case of diagnosis as normality (there is no NG flag: No), reliable diagnosis can be performed by performing diagnosis of the vehicle parts controlled based on the first timer 11 during the key-off time period.

As described above, the electronic control device in this embodiment includes a second power supply unit 20 to which a battery voltage of the battery 32 is supplied as a power supply voltage through the power relay 31 controlled to be turned on or off based on the ignition signal IG and a start signal generation unit 19 generating a start signal for the second power supply unit 20 based on a comparison result of the first timer diagnosis unit 13.

Accordingly, when the first timer 11 is abnormal as a result of diagnosis, the second power supply unit 20 can be started in response to the start signal from the start signal generation unit 19.

It should be noted that the first timer 11 can be used as an ignition-off timer that measures an ignition-off time period to diagnose accuracy of the off timer.

Alternatively, the first timer 11 can be used as a wake-up timer for starting the second power supply unit 20 after a predetermined key-off time period to diagnose accuracy of the wake-up timer.

In addition, the first power supply unit 10 (first timer diagnosis unit 13) is connected to the microcomputer 40 through the communication unit 22 to notify the microcomputer 40 of a diagnosis result obtained by the first timer diagnosis unit 13 during the key-off time period after a key-on time period commences. The first timer diagnosis unit 13 compares a timer value stored in the microcomputer 40 with those of the first timer 11 and the diagnostic timer 12 during the key-on time period.

The diagnosis result obtained during the key-off time period is left in the first timer diagnosis unit 13, and when the microcomputer is started, for example, after a key-on time period recommences, the microcomputer 40 can be notified of the failure of the timer having occurred during the key-off time period. Accordingly, it is possible to determine whether or not to perform diagnosis of the vehicle parts related to the key-off time period, and it is possible to prevent erroneous diagnosis that may occur if the diagnosis is performed.

In addition, when the ignition-off timer fails, the diagnostic timer 12 can be substituted as a second ignition-off timer that measures a key-off time period. When the ignition-off timer that measures a key-off time period fails, the diagnostic timer 12 can be diverted as an ignition-off timer and used for diagnosing the vehicle parts related to the key-off time period.

Third Embodiment

An electronic control device according to a third embodiment of the present invention will be described with reference to FIGS. 3 and 7.

Figure 3:
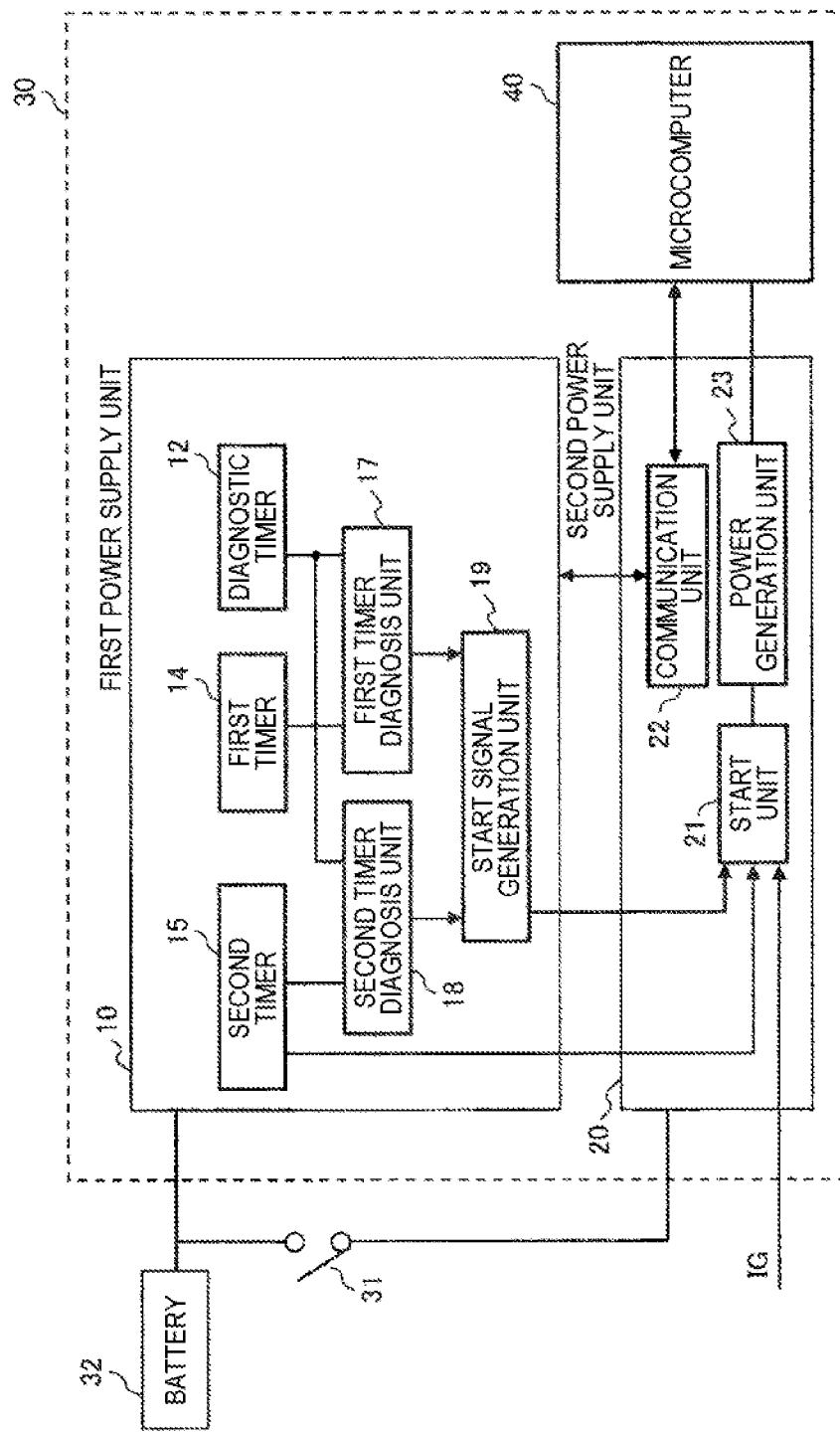
FIG. 3 is a schematic configuration diagram of an electronic control device in a third embodiment.

FIG. 3 illustrates a circuit configuration of the electronic control device in this embodiment. FIG. 7 illustrates a flowchart of timer diagnosis of the electronic control device in this embodiment.

In FIG. 3, a second timer 15 (wake timer) and a second timer diagnosis unit 18 of the first power supply unit 10 are added to the circuit configuration of FIG. 2 according to the second embodiment, and the other components identical to those in FIG. 2 operate in the same manner as in the second embodiment.

Here, the second timer 15 (wake timer) is a wake-up timer, which is a timer set by the microcomputer 40 to start the second power supply unit 20 every predetermined set time during the key-on time period.

As in an example of a flowchart for the electronic control device illustrated in FIG. 7, when the ignition signal IG is turned off, the microcomputer 40 starts the second timer 15 (wake timer) and the diagnostic timer 12 through the communication unit 22, and subsequently, shuts down the second power supply unit 20 and the microcomputer 40.

During the key-off time period, the second timer 15 (wake timer) and the diagnostic timer 12 count up timer values at predetermined time intervals. The second timer diagnosis unit 18 compares the second timer 15 (wake timer) and the diagnostic timer 12 every predetermined count cycle. In the example of FIG. 7, if a change amount of each timer value from a compared timer value every 60 seconds is between 55 seconds and 65 seconds, the timer is diagnosed as being normal (Yes). Otherwise, the timer is diagnosed as being abnormal (No).

In case of diagnosis as normality (Yes), diagnosis is repeatedly and continuously performed in the same way every 60 seconds, and the diagnosis of the timer is performed during the key-off time period, until the second power supply unit 20 is started after a value of the second timer 15 (wake timer) reaches a wake set value or the ignition signal IG is turned on.

When the wake-up timer value of the second timer 15 (wake timer) reaches the set value (Yes), the second power supply unit 20 is started. Alternatively, when the ignition signal IG is turned on, the second power supply unit 20 is started.

On the other hand, in case of diagnosis as abnormality (No), an NG flag as the diagnosis of the second timer is recorded in the second timer diagnosis unit 18. When a key-on time period commences, if a start setting of the second power supply unit 20 is in an on-state as a setting for diagnosis as abnormality from the microcomputer 40, the second power supply unit 20 is started in response to a start signal from the start signal generation unit 19 according to the determination of diagnosis as abnormality. If the start setting is in an off-state, the diagnosis of the timer is continued until the ignition signal IG is turned on or the wake-up timer value of the second timer 15 (wake timer) reaches the set value.

In this way, by continuously diagnosing the wake-up timer as the second timer 15 (wake timer) during the key-off time period, diagnosis as abnormality can be detected when the second timer 15 (wake timer) or the diagnostic timer 12 is abnormal during the key-off time period. Even if the wake-up timer (second timer 15) stops due to failure, the failure of the timer can be detected by starting the second power supply unit 20, while preventing the electronic control device from having a starting defect.

As described above, in the electronic control device in this embodiment, the first power supply unit 10 includes a second timer 15 for starting the second power supply unit 20 after a predetermined key-off time period and a second timer diagnosis unit 18 comparing the second timer 15 and the diagnostic timer 12 during the key-off time period, and the start signal generation unit 19 generates a start signal for the second power supply unit 20 based on diagnosis results of the first timer diagnosis unit 17 and the second timer diagnosis unit 18.

In addition, when the wake-up timer (second timer 15) or the diagnostic timer 12 fails, abnormality is detected by the first timer diagnosis unit 17, and accordingly, the second power supply unit 20 is started.

Accordingly, for example, even if the second timer 15 (wake-up timer) stops due to failure, which makes it impossible to start the second power supply unit 20, the second power supply unit 20 can be started by a start signal of the start signal generation unit 19 resulting from detection of abnormality by the diagnostic units (first timer diagnosis unit 17 and second timer diagnosis unit 18). Thus, a starting defect can be avoided, such that the electronic control device performs control at the time of failure.

Fourth Embodiment

Figure 4:
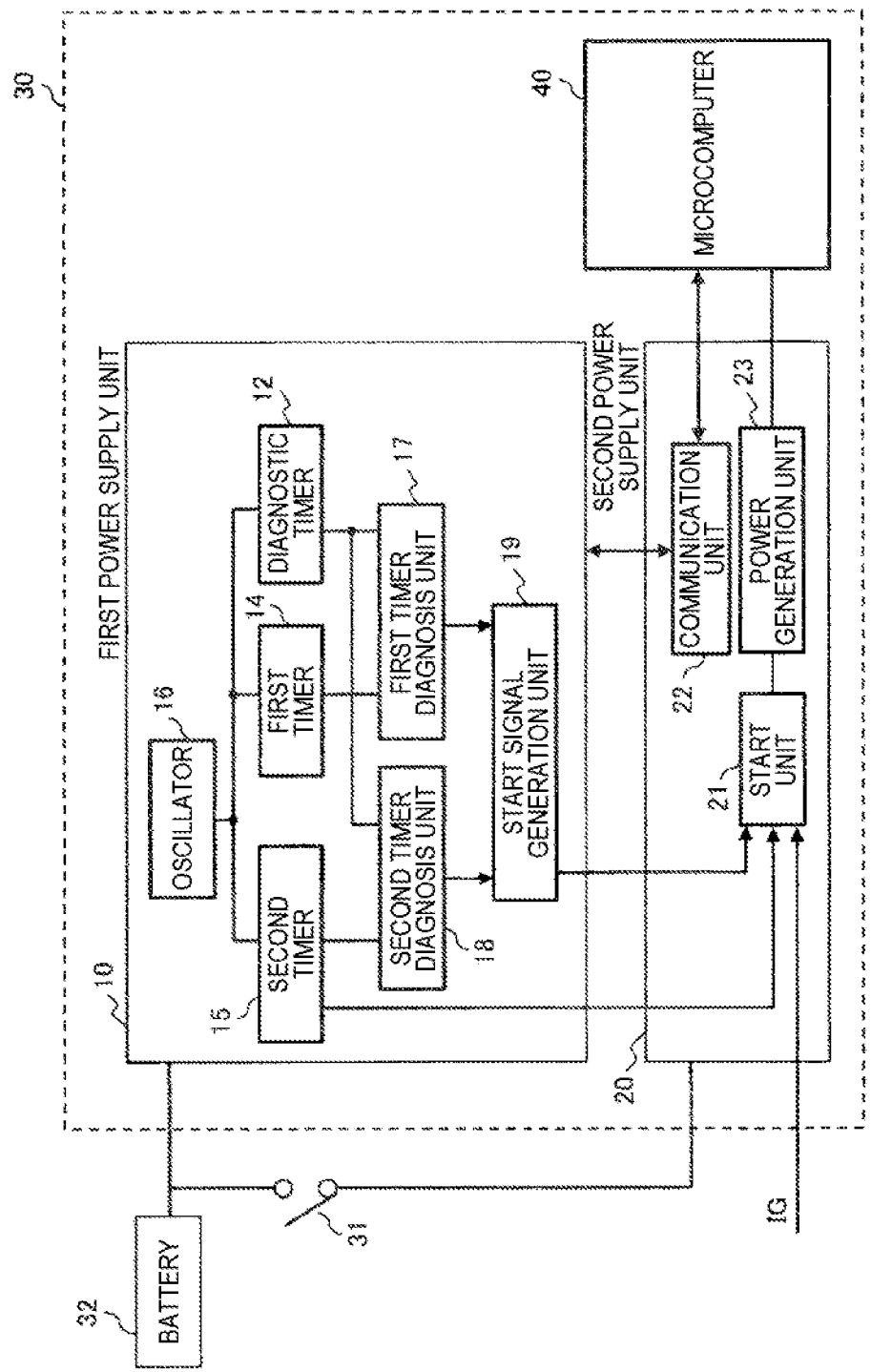
FIG. 4 is a schematic configuration diagram of an electronic control device in a fourth embodiment.

An electronic control device according to a fourth embodiment of the present invention will be described with reference to FIG. 4. FIG. 4 illustrates a circuit configuration of the electronic control device in this embodiment.

In FIG. 4, an oscillator 16 of the first power supply unit 10 is added to the circuit configuration of FIG. 3 according to the third embodiment, and the other components identical to those in FIG. 3 operate in the same manner as in the third embodiment.

In the configuration of FIG. 4, the first timer 14, the second timer 15, and the diagnostic timer 12 share the oscillator 16, on which time measurement is based, in common. By using the oscillator 16 in common for each timer as in this embodiment (FIG. 4), there is a merit in that a circuit scale can be reduced. However, if the oscillator 16 fails, all of the first timer 14, the second timer 15, and the diagnostic timer 12 stop, and a failure mode occurs and accordingly timer diagnosis cannot be performed.

Fifth Embodiment

An electronic control device according to a fifth embodiment of the present invention will be described with reference to FIG. 5. FIG. 5 illustrates a circuit configuration of the electronic control device in this embodiment.

In FIG. 5, a diagnostic oscillator 24 is further added to the circuit configuration of FIG. 4 according to the fourth embodiment, and the other components identical to those in FIG. 4 operate in the same manner as in the fourth embodiment.

In the configuration of FIG. 5, the diagnostic oscillator 24 is used only for the diagnostic timer 12 as its basis. By using the diagnostic oscillator 24 only for the diagnostic timer 12, even if the oscillator 16 fails or the diagnostic oscillator 24 fails, abnormality can be detected through timer diagnosis, thereby improving a diagnosis rate concerning diagnosis as failure.

In each of the above-described embodiments, for example, the first power supply unit 10 and the second power supply unit 20 can be constituted by a single integrated circuit such as an application specific integrated circuit (ASIC), thereby reducing a cost of the electronic control device.

In addition, if there is abnormality as a diagnosis result of the first timer diagnosis unit 13 or 17, the diagnosis of the vehicle using the first timer 11 can be stopped after a key-on time period commences, thereby not diagnosing vehicle parts related to the key-off time period to prevent erroneous diagnosis.

It should be noted that the present invention is not limited to the above-described embodiments, and includes various modifications.

For example, the above-described embodiments have been described in detail in order to explain the present invention in an easy-to-understand manner, and are not necessarily limited to having all the configurations described above. In addition, a part of the configuration of one embodiment may be replaced with that of the configuration of another embodiment, and the configuration of one embodiment may be added to the configuration of another embodiment. In addition, with respect to a part of the configuration of each embodiment, it is possible to perform addition of another configuration, deletion, or replacement with another configuration.

REFERENCE SIGNS LIST

10 first power supply unit
11 (first) timer
12 diagnostic timer
13 (first) timer diagnosis unit
14 first timer (off timer)
15 second timer (wake timer)
16 oscillator
17 first timer diagnosis unit
18 second timer diagnosis unit
19 start signal generation unit
20 second power supply unit
21 start unit
22 communication unit
23 power generation unit
24 diagnostic oscillator
30 electronic control device 31 power relay
32 battery
40 microcomputer

The invention claimed is:

1. An electronic control device comprising a first power supply unit to which a battery voltage is always supplied as a power supply voltage,
wherein the first power supply unit includes:
a first timer that measures a key-off time period;
a diagnostic timer different from the first timer;
a first timer diagnosis unit that compares a timer value of the first timer with that of the diagnostic timer during the key-off time period;
a second power supply unit to which the battery voltage is supplied as a power supply voltage through a power relay controlled to be turned on or off by an ignition signal;
a start signal generation unit that generates a start signal for the second power supply unit based on a comparison result of the first timer diagnosis unit, wherein
the first power supply unit further includes:
a second timer for starting the second power supply unit after a predetermined key-off time period; and
a second timer diagnosis unit that compares the second timer and the diagnostic timer during the key-off time period, and
the start signal generation unit generates a start signal for the second power supply unit based on diagnosis results of the first timer diagnosis unit and the second timer diagnosis unit; and
a first oscillator and a diagnostic oscillator on which time measurement is based,
wherein
the first timer and the second timer are connected in common to the first oscillator, and
the diagnostic timer is connected to the diagnostic oscillator.

2. The electronic control device according to claim 1, wherein the first timer is an ignition-off timer that measures an ignition-off time period.

3. The electronic control device according to claim 1, wherein the first timer is a wake-up timer for starting the second power supply unit after a predetermined key-off time period.

4. The electronic control device according to claim 1, wherein the first timer diagnosis unit is connected to a microcomputer through a communication unit to notify the microcomputer of a diagnosis result obtained by the first timer diagnosis unit during the key-off time period after a key-on time period commences.

5. The electronic control device according to claim 1, wherein the first timer diagnosis unit is connected to a microcomputer through a communication unit to compare a timer value stored in the microcomputer with those of the first timer and the diagnostic timer when a key-on time period commences.

6. The electronic control device according to claim 3, wherein when the wake-up timer or the diagnostic timer fails, the second power supply unit is started based on abnormality detected by the first timer diagnosis unit.

7. The electronic control device according to claim 1, further comprising a first oscillator on which time measurement is based,
wherein the first timer, the second timer, and the diagnostic timer are connected in common to the first oscillator.

8. The electronic control device according to claim 1, further comprising a first oscillator and a diagnostic oscillator on which time measurement is based,
wherein
the first timer and the second timer are connected in common to the first oscillator, and
the diagnostic timer is connected to the diagnostic oscillator.

9. The electronic control device according to claim 2, wherein when the ignition-off timer fails, the diagnostic timer is substituted as a second ignition-off timer that measures a key-off time period.

10. The electronic control device according to claim 1, wherein the first power supply unit and the second power supply unit are constituted by a single integrated circuit.

11. The electronic control device according to claim 1, wherein if there is abnormality as a diagnosis result of the first timer diagnosis unit, diagnosis of a vehicle using the first timer is stopped after a key-on time period commences.

12. A diagnosis method comprising:
providing an electronic control device comprising a first power supply unit to which a battery voltage is always supplied as a power supply voltage, wherein the first power supply unit includes:
a first timer that measures a key-off time period;
a diagnostic timer different from the first timer;
a first timer diagnosis unit that compares a timer value of the first timer with that of the diagnostic timer during the key-off time period;
providing a second power supply unit to which the battery voltage is supplied as a power supply voltage through a power relay controlled to be turned on or off by an ignition signal;
providing a start signal generation unit that generates a start signal for the second power supply unit based on a comparison result of the first timer diagnosis unit, wherein
the first power supply unit further includes:
a second timer for starting the second power supply unit after a predetermined key-off time period; and
a second timer diagnosis unit that compares the second timer and the diagnostic timer during the key-off time period, and
the start signal generation unit generates a start signal for the second power supply unit based on diagnosis results of the first timer diagnosis unit and the second timer diagnosis unit; and
providing a first oscillator and a diagnostic oscillator on which time measurement is based,
wherein
the first timer and the second timer are connected in common to the first oscillator, and
the diagnostic timer is connected to the diagnostic oscillator.

* * * * *